US010737283B2

(12) United States Patent
Weaver et al.

(10) Patent No.: US 10,737,283 B2
(45) Date of Patent: Aug. 11, 2020

(54) FLUID SEPARATION APPARATUS AND SYSTEM

(71) Applicant: National Oilwell Varco, L.P., Houston, TX (US)

(72) Inventors: Randall Ferrain Weaver, McAlester, OK (US); Mark Ernest Wolf, Katy, TX (US); Clifton Dee Eggleston, McAlester, OK (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 16/084,074

(22) PCT Filed: Mar. 10, 2017

(86) PCT No.: PCT/US2017/021928
§ 371 (c)(1),
(2) Date: Sep. 11, 2018

(87) PCT Pub. No.: WO2017/156468
PCT Pub. Date: Sep. 14, 2017

(65) Prior Publication Data
US 2019/0262844 A1 Aug. 29, 2019

Related U.S. Application Data
(60) Provisional application No. 62/307,120, filed on Mar. 11, 2016.

(51) Int. Cl.
B04C 5/22 (2006.01)
B01D 17/02 (2006.01)
(Continued)

(52) U.S. Cl.
CPC ............ B04C 5/22 (2013.01); B01D 17/0217 (2013.01); B01D 17/12 (2013.01); B04C 5/28 (2013.01); B04C 11/00 (2013.01)

(58) Field of Classification Search
CPC .... B04C 5/22; B04C 5/28; B04C 3/06; B04C 11/00; B01D 14/0217
(Continued)

(56) References Cited

U.S. PATENT DOCUMENTS 4,148,723 A 4/1979 Mozley
5,667,687 A * 9/1997 Lange ...................... B04C 5/13
210/512.2

FOREIGN PATENT DOCUMENTS

EP 2883586 A1 6/2015

OTHER PUBLICATIONS

International Search Report and Written Opinion dated Jun. 12, 2017, for International Application No. PCT/US2017/021928.

* cited by examiner

Primary Examiner — Claire A Norris
(74) Attorney, Agent, or Firm — Conley Rose, P.C.

(57) ABSTRACT

A fluid separation apparatus includes a hydrocyclone (100) having an orifice (134) therein, a housing (202) disposed in the hydrocyclone and having a bore (204), a piston (240) disposed in the bore (204) of the housing (202), and a first annular seal (248) disposed between the housing (202) and the piston (240) and configured to restrict fluid communication between the housing (202) and the piston (240), wherein the piston (240) includes a passage (242) extending through the piston (240) and having a pin (254) coupled to a first end (240a) of the piston, the piston (240) being actuatable to move between a first position (260) where the pin (254) is clear of the orifice (134) of the hydrocyclone, and a second position where the pin (254) is disposed in the orifice (134), wherein the piston (240) is configured such that as the piston is actuated from the first position to the second position, fluid is permitted to flow into the passage
(Continued)

(242) of the piston (240) from the bore (204) of the housing (202).

20 Claims, 5 Drawing Sheets

(51) Int. Cl.
*B04C 5/28* (2006.01)
*B01D 17/12* (2006.01)
*B04C 11/00* (2006.01)

(58) Field of Classification Search
USPC .................. 210/512.2, 108, 512.3; 209/725; 137/244
See application file for complete search history.

FLUID SEPARATION APPARATUS AND SYSTEM

CROSS-REFERENCE TO RELATED APPLICATIONS

This application is a 35 U.S.C. § 371 national stage application of PCT/US2017/021928 filed on Mar. 10, 2017, entitled "Fluid Separation Apparatus and System," which claims benefit of U.S. provisional patent application Ser. No. 62/307,120 filed Mar. 11, 2016, and entitled "Fluid Separation Apparatus and System," which are hereby incorporated herein by reference in their entirety.

STATEMENT REGARDING FEDERALLY SPONSORED RESEARCH OR DEVELOPMENT

Not applicable.

BACKGROUND

The present disclosure relates to a system for separating a mixture of two fluid phases. In particular, the present disclosure relates to a system including an apparatus configured for reducing blockage in a port of a fluid separator, such as a hydrocyclone.

In oil production processes and in drilling operations, a fluid stream including a mixture of oil and water is often recovered, necessitating fluid separation of the oil and water phases of the fluid stream prior to disposal or downstream processing. In some applications, deoiling hydrocyclones are employed to provide a compact and time-efficient apparatus for separating at least a portion of the water and oil phases of the fluid stream. Hydrocyclone separators typically comprise a chamber having a cylindrical portion coupled to a frustoconical portion, and generally operate by converting pressure energy into velocity as a fluid mixture of water and oil enters the hydrocyclone through a tangential inlet. The tangential inlet flow causes the fluid inside the hydrocyclone to spin or rotate therein, creating a centrifugal force that multiplies the natural buoyancy of small oil droplets. Because those oil droplets have a lower density relative to water, the water and oil phases of the inlet fluids stream may be separately extracted from the hydrocyclone; the water is extracted via a clean water outlet while the oil is extracted via a waste reject outlet. In some applications, the waste reject outlet of the hydrocyclone includes a relatively small orifice that is susceptible to blockage via particulates and other debris suspended in the waste reject stream. Thus, it is necessary to periodically unblock the orifice of the waste reject outlet to ensure the efficacy of the hydrocyclone in substantially separating the water and oil phases of the inlet fluid stream.

SUMMARY

An embodiment of a fluid separation apparatus comprising a hydrocyclone having an orifice therein, a housing disposed in the hydrocyclone and having a bore, a piston disposed in the bore of the housing, and a first annular seal disposed between the housing and the piston and configured to restrict fluid communication between the housing and the piston, wherein the piston comprises a passage extending through the piston and having a pin coupled to a first end of the piston, the piston being actuatable to move between a first position where the pin is clear of the orifice of the hydrocyclone, and a second position where the pin is disposed in the orifice, wherein, the piston is configured such that as the piston is actuated from the first position to the second position, fluid is permitted to flow into the passage of the piston from the bore of the housing. In some embodiments, the housing comprises a radially extending port. In some embodiments, the piston comprises an annular shoulder extending radially from a second end of the piston. In certain embodiments, the fluid separation apparatus further comprises a second annular seal disposed between the housing and the piston and configured to restrict fluid communication between the housing and the piston. In certain embodiments, the radially extending port of the housing is disposed axially between the first and second annular seals. In some embodiments, the first and second annular seals form an annular chamber between the first and second annular seals. In some embodiments, the fluid separation apparatus further comprises an endcap coupled to the first end of the piston, the endcap comprising a port extending through the endcap and in fluid communication with the bore of the piston.

An embodiment of a fluid separation apparatus comprises a housing having a bore and a radially extending port in fluid communication with the bore, a piston disposed in the bore of the housing, the piston comprising a first end and a second end, a passage extending through the piston, and a pin coupled to and extending away from the first end, and a first annular seal disposed between the housing and the piston and configured to restrict fluid communication between the housing and the piston, wherein the piston is configured to move between a first position where the pin is in a retracted position, and a second position where the pin is in an extended position. In some embodiments, the fluid separation apparatus further comprises a retainer ring disposed in the bore of the housing and configured to limit the displacement of the piston within the housing. In some embodiments, the fluid separation apparatus further comprises a hydrocyclone having a fluid-conveying orifice, wherein the pin of the piston is aligned with the orifice. In certain embodiments, the fluid separation apparatus further comprises a hydrocyclone, the hydrocyclone comprising a radially extending port in fluid communication with the radially extending port of the housing. In certain embodiments, the piston comprises an annular shoulder extending radially from the second end of the piston. In some embodiments, in response to a pressure force exerted on the annular shoulder, the piston is configured to shift from the second position to the first position. In some embodiments, the piston is configured to permit fluid to flow into the bore of the piston from the bore of the housing when the piston is moved from the first position to the second position. In certain embodiments, fluid is flowed through the radial port of the housing when the piston is moved from the first position to the second position.

An embodiment of a fluid separation apparatus comprises a housing having a bore, a piston disposed in the bore of the housing, the piston having a first end, a second end, and a passage extending through the piston, a first annular seal disposed between the housing and the piston and configured to restrict fluid communication between the housing and the piston, and an endcap coupled to the first end of the piston, the endcap comprising a pin extending away from the endcap and a port extending through the endcap and in fluid communication with the bore of the piston, wherein the piston is configured to move between a first position where the pin is in a retracted position, and a second position where the pin is in an extended position. In some embodiments, as the piston is moved from the first position to the second position, fluid is permitted to flow into the bore of the piston from the bore of the housing. In some embodiments, the piston comprises an annular shoulder extending radially from the second end of the piston, and wherein, in response to a pressure force exerted on the annular shoulder, the piston is shifted from the second position to the first position. In certain embodiments, the housing comprises a radially extending port. In certain embodiments, the radially extending port of the housing is disposed axially between the first annular seal and a second annular seal disposed between the housing and the piston, wherein the second annular seal is configured to restrict fluid communication between the housing and the piston.

BRIEF DESCRIPTION OF THE DRAWINGS

For a detailed description of various exemplary embodiments, reference will now be made to the accompanying drawings in which.

DETAILED DESCRIPTION OF THE DISCLOSED EXEMPLARY EMBODIMENTS

Figure 1:
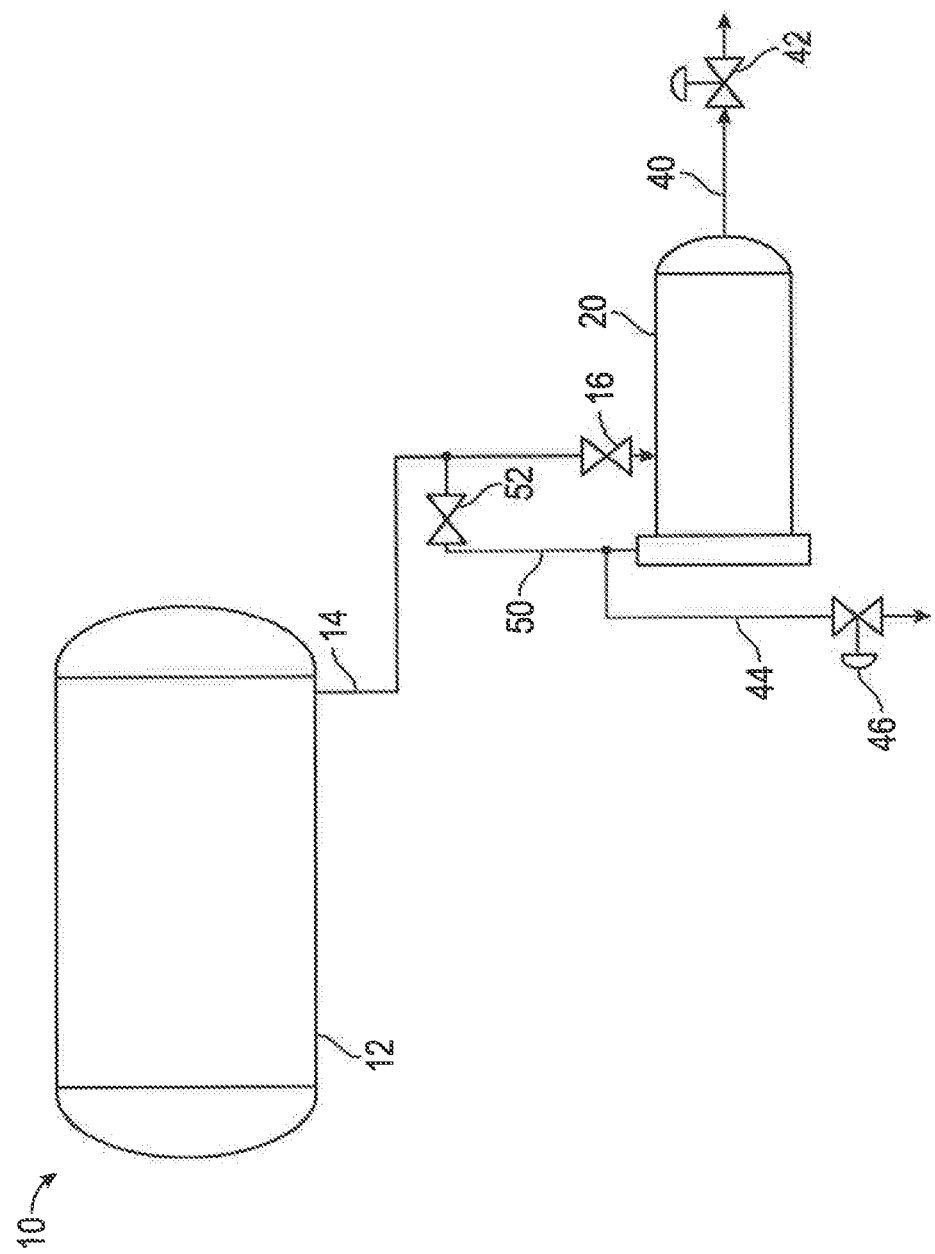
FIG. 1 is a schematic view of an embodiment of a fluid separation system in accordance with the principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

Referring now to FIG. 1, an embodiment of a fluid separation system 10 is shown. Fluid separation system 10 is generally configured to separate oil and water phases of a fluid stream. In certain embodiments, fluid separation system 10 may be utilized in onshore and offshore hydrocarbon drilling and production systems for separating oil and water phases of fluid streams. In other embodiments, fluid separation system 10 may be utilized in other industrial applications requiring the separation of individual fluid phases of a fluid stream. In the embodiment shown in FIG. 1, fluid separation system 10 generally includes a fluid storage vessel 12, a fluid conduit 14 including an inlet valve 16 fluidically coupling the storage vessel 12 with a fluid separation vessel 20, a treated water fluid conduit 40 including a control valve 42, an oily waste fluid conduit 44 including a control valve 46, and a cleaning fluid conduit 50 including a cleaning conduit valve 52.

In this arrangement, during normal operation inlet valve 16 is open and cleaning conduit valve 52 is closed, causing an inlet fluid stream including a mixture of water and oil phases to be supplied to fluid separation vessel 20 from fluid storage vessel 12 via fluid conduit 14. Once supplied to fluid separation vessel 20, vessel 20 acts to separate the water and oil phases of the inlet fluid stream into a treated water stream outputted to treated water conduit 40 and an oily waste stream outputted to oily waste conduit 44. In this manner, the treated water stream includes a relatively higher degree of water content and a lower degree of oil content than the oily waste stream due to the fluid separation performed within fluid separation vessel 20, as will be discussed further herein. In certain embodiments, the treated water stream and oily waste stream are subjected to further fluid processing downstream of fluid separation vessel 20. In other embodiments, the oily waste stream exiting fluid separator vessel 20 may be returned to storage vessel 12. Control valves 42 and 46 are configured to control the fluid flow through their respective fluid conduits 40 and 44.

The control valve 42 may be automatically opened or closed to allow clean water to leave from the fluid treatment system through an outlet (not shown) in treated water conduit 40 according to the interface level of water and oil in storage vessel 12. For example, in certain embodiments, if the interface level in the storage vessel 12 is too low, control valve 42 will close to reduce the amount of fluid exiting fluid separation system 10. In some embodiments, control valve 42 provides back pressure on the fluid separator vessel 20 to forcibly eject oily waste into oily waste conduit 44. In some embodiments, control valve 46 provides back pressure on fluid separator vessel to forcibly eject treated water into treated water conduit 40. As will be discussed further herein, cleaning conduit 50 is configured to provide a fluid stream or pressure to remove or reduce blockages in a plurality of hydrocyclones disposed within fluid separator vessel 20 via actuating one or more orifice servicing assemblies disposed within vessel 20 to physically engage and eject materials forming the blockage, as will be described further herein. Particularly, during normal operation, valve 52 is closed to restrict fluid passage through cleaning conduit 50, and is subsequently opened during a cleaning operation to remove or reduce blockages in the hydrocyclones of fluid separator vessel 20.

Figure 2:
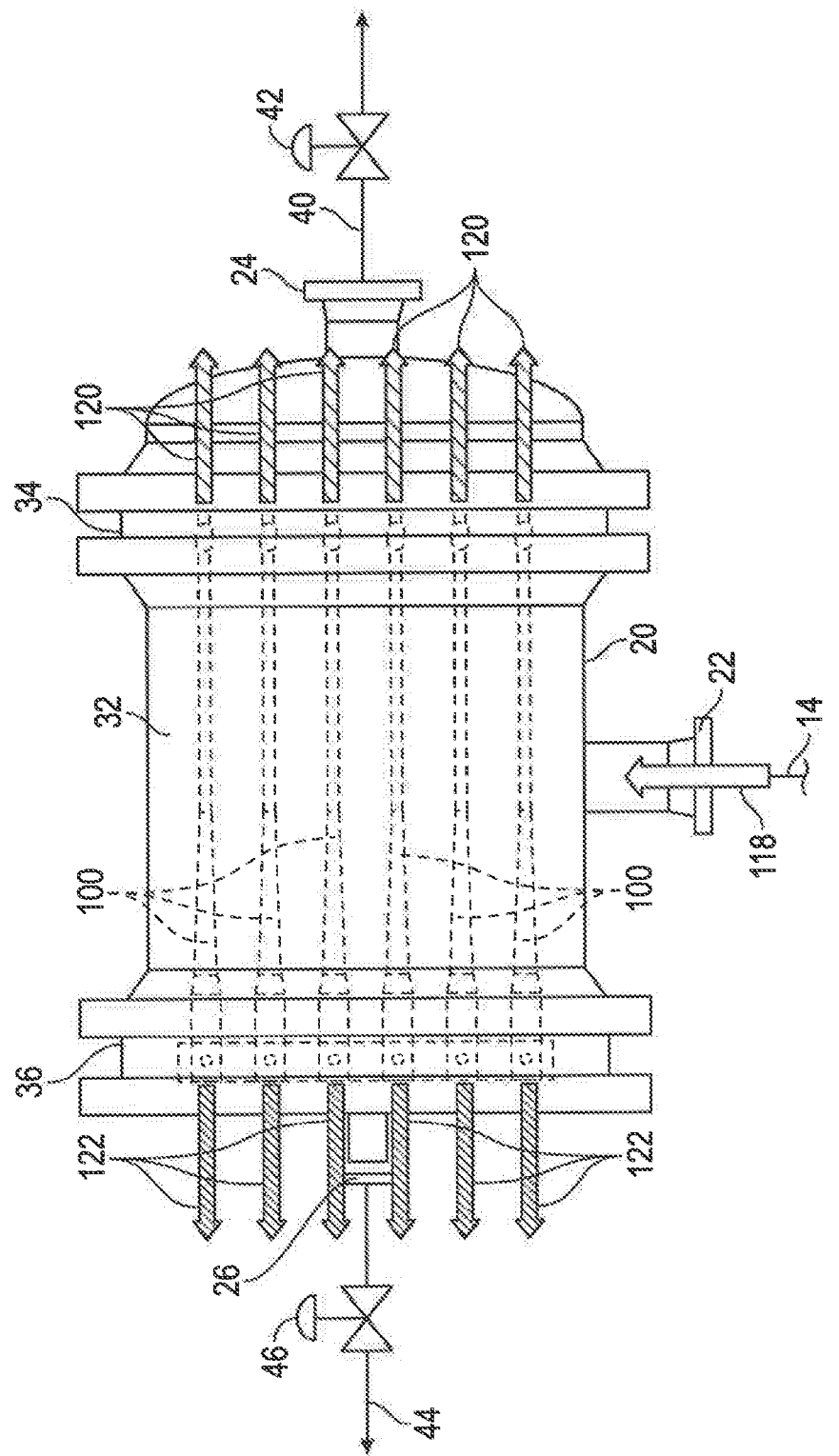
FIG. 2 is a schematic view of an embodiment of a fluid separator vessel of the fluid separation system of FIG. 1.
Figure 3:
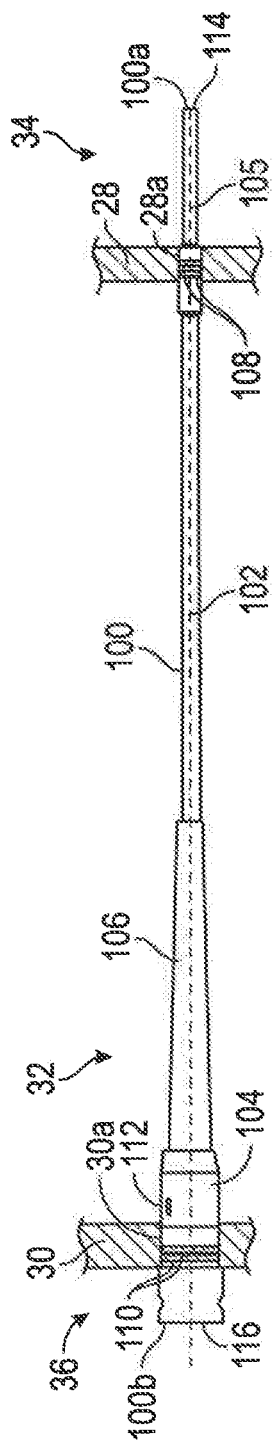
FIG. 3 is a side view of an embodiment of a hydrocyclone of the fluid separator vessel of FIG. 2.

Referring to FIGS. 1-3, fluid separator vessel 20 includes a plurality of fluid separation apparatuses or hydrocyclones 100 disposed therein for separating the water and gas phases of an inputted fluid stream. In this embodiment, fluid separator vessel 20 generally includes a fluid inlet 22 in fluid communication with fluid conduit 14, a treated water outlet 24 in fluid communication with treated water conduit 40, an oily waste outlet 26 in fluid communication with oily waste conduit 44, a first plate or barrier 28 (shown in FIG. 3) extending laterally through fluid separator vessel 20 and disposed proximal treated water outlet 24, and a second plate or barrier 30 (shown in FIG. 3) extending laterally through fluid separator vessel 20 and disposed proximal oily waste outlet 26. Plates 28 and 30 divide the internal volume of fluid separator vessel 20 into three separate, fluidically sealed chambers: a first or inlet chamber 32, a second or treated water chamber 34, and a third or oily waste chamber 36.

As shown particularly in FIG. 3, each hydrocyclone extends between plates 28 and 30, and has a first end 100a, and a second end 100b distal first end 100a. The first end 100a is disposed within treated water chamber 34 while second end 100b is disposed within oily waste chamber 36. In this embodiment, each hydrocyclone 100 has a central or longitudinal axis 105 and includes a body 102 having a generally cylindrical portion 104, a frustoconical portion 106, a first pair of annular seals 108 extending into an outer surface of body 102 and disposed proximal first end 100a, a second pair of annular seals 110 extending into the outer surface of body 102 and disposed proximal second end 100b, and a fluid inlet 112 extending radially through the cylindrical portion 104 of body 102. The first pair of annular seals 108 sealingly engage an inner surface of an aperture 28a extending through first plate 28 while the second pair of annular seals 110 sealingly engage an inner surface of an aperture 30a of second plate 30. The sealing engagement provided by annular seals 108 and 110 restrict fluid communication between inlet chamber 32, treated water chamber 34, and oily waste chamber 36.

In this embodiment, each hydrocyclone 100 also includes a first or treated water outlet 114 at first end 100a, and a second or oily waste outlet 116 at second end 100b. In this arrangement, an inlet fluid stream 118 enters inlet chamber 32 of fluid separator vessel 20 via fluid inlet 22. Once in inlet chamber 32, the inlet fluid stream 118 flows into each hydrocyclone 100 of fluid separator vessel 20 via fluid inlets 112. Within the body 102 of each hydrocyclone 100, the oil and water phases of inlet fluid stream 118 are separated via centripetal forces applied thereto into a first or treated water stream 120 and a second or oily waste stream 122, where treated water stream 120 exits hydrocyclones 100 via treated water outlet 114 while oily waste stream 122 exits hydrocyclones 120 via oily waste outlet 116. Following the exit from hydrocyclones 100, treated water stream 120 flows into treated water conduit 40 via treated water chamber 34 and treated water outlet 24, while oily waste stream 122 flows into oily waste conduit 44 via oily waste chamber 36 and oily waste outlet 26. As noted above, treated water stream 120 includes a higher degree of content or concentration of water and a lower degree of content or concentration of hydrocarbons than oily waste stream 122 due to the fluid separation performed by hydrocyclones 100.

Figure 4:
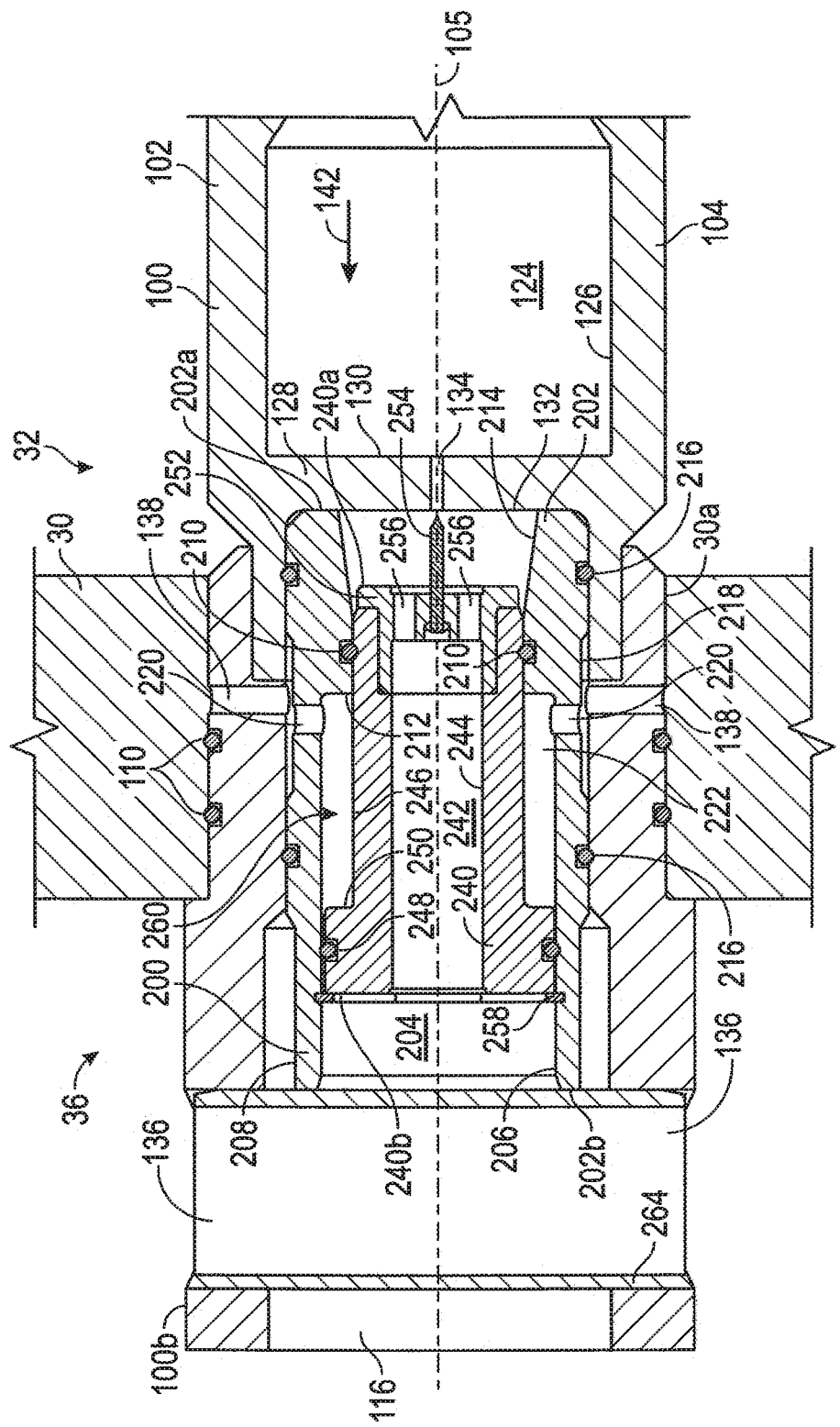
FIG. 4 is a cross-sectional view of an embodiment of an orifice servicing apparatus of the hydrocyclone of FIG. 3, shown in an operating position.
Figure 5:
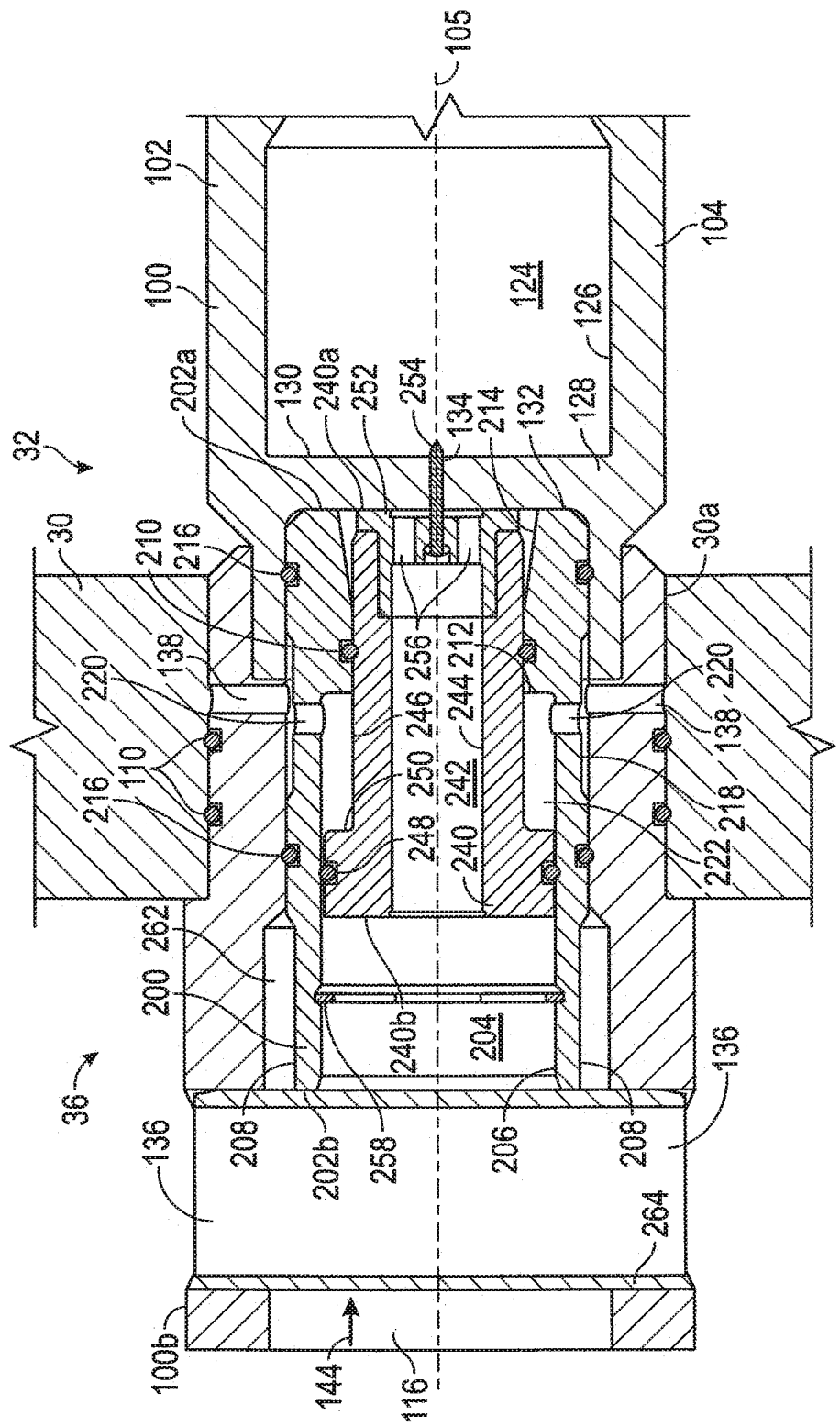
FIG. 5 is a cross-sectional view of the orifice servicing apparatus of FIG. 4, shown in a cleaning position.

Referring to FIGS. 3-5, an embodiment of an orifice servicing assembly 200 (shown in FIGS. 4 and 5) disposed within the second end 100b of a hydrocyclone 100 is shown. In this embodiment, hydrocyclone 100 includes a central bore 124 defined by a generally cylindrical inner surface 126 extending between ends 100a and 100b. The cylindrical portion 104 of hydrocyclone 100 includes a radially extending barrier 128 having a first surface 130 and a second surface 132 axially spaced from first surface 130. Barrier 128 also includes a centrally disposed orifice 134 extending between first surface 130 and second surface 132, where orifice 134 provides fluid communication between inlet 112 (shown in FIG. 3) and oily waste outlet 116. The cylindrical portion 104 of hydrocyclone 100 also includes a pair of circumferentially spaced, radially extending apertures 136 disposed proximal second end 100b, and a plurality of circumferentially spaced, radially extending ports 138 disposed longitudinally between radial apertures 136 and barrier 128. As shown in FIGS. 4 and 5, radial ports 138 are in fluid communication with inlet chamber 32 of fluid separator vessel 20. As will be explained further herein, components of orifice servicing assembly 200 restrict fluid communication between radial ports 138 and oily waste outlet 116.

As will be explained in more detail below, orifice servicing assembly 200 is configured to unblock, or at least reduce a blockage, within orifice 134 of hydrocyclone 100. Further, orifice servicing assembly 200 is configured to insert a component within orifice 134 to reduce a blockage therein by utilizing fluid flow or hydraulic pressure acting upon components of orifice servicing assembly 200. In this manner, a blockage within orifice 134 may be reduced without needing to disassemble fluid separator vessel 20 and remove the blocked hydrocyclone 100 therefrom. Further, orifice servicing system 200 is configured to reduce a blockage within orifice 134 without utilizing check valves, return springs, or other mechanisms that may become blocked over the service life of the hydrocyclone 100 due to debris or other materials that are present in the oily waste stream 122 flowing through orifice 134 and oily waste outlet 116. Particularly, check valves, return springs, and other such mechanisms known in the art are susceptible to blockage, which may interfere with the operation of the orifice servicing assembly, and in turn, the operation of hydrocyclone 100 as a blockage is formed within orifice 134.

Referring still to FIGS. 3-5, orifice servicing assembly 200 is disposed coaxially with longitudinal axis 105 within bore 124 of hydrocyclone 100 and generally includes an outer housing 202, and an inner piston 240 slidably disposed therein. In this embodiment, housing 202 has a first end 202a, a second end 202b, a central bore 204 defined by a generally cylindrical inner surface 206 extending between ends 202a and 202b, and a generally cylindrical outer surface 208 extending between ends 202a and 202b. The inner surface 206 of bore 204 includes an annular seal 210 disposed within an annular groove extending therein for sealingly engaging piston 240. Inner surface 206 also includes an annular shoulder 212 longitudinally adjacent annular seal 210 and facing second end 202b. Inner surface 206 further includes a frustoconical section 214 extending substantially between first end 202a and annular seal 210. The outer surface 208 of housing 202 includes a pair of axially spaced annular seals 216 disposed in corresponding annular grooves extending into outer surface 208, where annular seals 216 sealingly engage the inner surface 126 of hydrocyclone 100. Outer surface 208 also includes an annular groove 218 extending radially therein, where annular groove 218 extends substantially between annular seals 216. Housing 202 includes a plurality of circumferentially spaced ports 220 that extend from annular groove 218 in outer surface 208 and inner surface 206, and are disposed longitudinally between annular seals 216.

In this embodiment, piston 240 has a first end 240a, a second end 240b, a central bore or passage 242 defined by a generally cylindrical inner surface 244 extending between ends 240a and 240b, and a generally cylindrical outer surface 246 extending between ends 240a and 240b. The outer surface 246 of piston 240 includes an annular seal 248 disposed in an annular groove extending therein, wherein annular seal 248 is disposed proximal second end 240b and sealingly engages the inner surface 206 of outer housing 202. Outer surface 246 also includes an annular shoulder 250 shoulder proximal annular seal 248 that faces first end 240a of piston 240. The sealing engagement of annular seal 248 against inner surface 206 of housing 202 and the sealing engagement of annular seal 210 against the outer surface 246 of piston 240 forms an annular chamber 222 within bore 204 of housing 202 extending between seals 248 and 210, where annular chamber 222 is in fluid communication with radial ports 220. The first end 240a of piston 240 comprises a generally cylindrical endcap 252 including a pin or piercing member 254 extending longitudinally from endcap 252. Pin 254 is affixed to endcap 252 and includes a pointed tip for piercing or breaking up debris disposed within orifice 134, as will be explained further herein. Endcap 252 also includes a plurality of circumferentially spaced, longitudinally extending ports 256 for providing fluid communication between orifice 134 and bore 242 of piston 240. Ports 256 also provide fluid communication between bore 242 of piston 240 and bore 204 of housing 202. In this arrangement, longitudinal ports 256 are disposed circumferentially about pin 254 for providing fluid flow through endcap 252.

As will be discussed in more detail below, piston 240 includes a first or operating position 260 (shown in FIG. 4) and a second or cleaning/servicing position 262 (shown in FIG. 5) axially spaced from operating position 260. As will be discussed further herein, in response to hydraulic pressure, piston 240 is slidably displaceable between positions 260 and 262 within bore 204 of outer housing 202. An annular retainer ring 258, coupled to and extending radially inwards from inner surface 206 of housing 202, retains piston 240 within the bore 204 of housing 202. Specifically, retainer ring 258 limits the amount of slideable displacement of piston 240 within housing 202, thereby allowing piston 240 to slide between the operating position 260 and the cleaning position 262 while preventing piston 240 from being ejected entirely from bore 204 of housing 202.

Referring still to FIGS. 3-5, a tubular member or retaining pin 264 extends radially through bore 124 of hydrocyclone 100 and is disposed within each of the circumferentially spaced radial apertures 136, thereby coupling retaining pin 264 with hydrocyclone 100. An outer surface of retaining pin 264 is disposed directly adjacent or physically engages the second end 202b of outer housing 202. In this arrangement, retaining pin 264 substantially restricts relative longitudinal movement between hydrocyclone 100 and outer housing 202. Particularly, retaining pin 264 retains outer housing 202 within hydrocyclone 100 such that first end 202a is disposed directly adjacent or physically engages the second surface 132 of barrier 128. In certain embodiments, retaining pin 264 comprises a spring pin for providing a biasing force against the second end 202b of housing 202 in the direction of barrier 128 such that first end 202a abuts second surface 132 of barrier 128.

Referring to FIGS. 1, 2, 4, and 5, as described above, piston 240 is actuatable to move between operating position 260 shown in FIG. 4 and the cleaning position 262 shown in FIG. 5. Particularly, frictional and sealing engagement between annular seal 248 of piston 240 and the inner surface 206 of housing 202, and annular seal 210 of housing 202 and the outer surface 246 of piston 240, restricts relative longitudinal movement between piston 240 and housing 202 in the absence of a sufficient or threshold fluid flow or pressure differential between inlet chamber 32 and oily waste chamber 36. During normal operation of fluid separation system 10, inlet fluid stream 118 enters inlet chamber 32 of fluid separator vessel 20 via fluid inlet 22, and from inlet chamber 32 the inlet fluid stream 118 enters the hydrocyclones 100 of fluid separator vessel 20 via inlets 112.

Once in the bore 124 of hydrocyclone 100, the inlet fluid stream 118 is separated into treated water stream 120 and oily waste stream 122, where oily waste stream 122 flows through bore 124 in the direction of arrow 142 in FIG. 4. In the direction of arrow 142, the oily waste stream 122 flows through orifice 134 and into the bore 204 of outer housing 202, where oily waste stream 122 is then directed via frustoconical surface 214 through longitudinal ports 256 and into bore 242 of piston 240. From bore 242, the oily waste stream 122 exits orifice servicing assembly 200 and hydrocyclone 100 (flowing around the radially extending retaining pin 264) as it flows through oily waste outlet 116.

In this arrangement, fluid within inlet chamber 32 is disposed at a higher pressure than fluid disposed in oily waste chamber 36, where fluid disposed in bore 242 of piston 240 is at substantially the same fluid pressure as fluid disposed in waste chamber 36, and fluid disposed in annular chamber 222 is at substantially the same fluid pressure as the fluid disposed in inlet chamber 32. The pressure differential between chambers 32 and 36 thereby applies a net pressure force against annular shoulder 250, displacing piston 240 towards retainer ring 258 such that piston 240 is held in operating position 260. Specifically, annular chamber 222 formed in the bore 204 of housing 202 is in fluid communication with inlet chamber 32 of fluid separator vessel 20 via radial ports 138 of hydrocyclone 100 and the radial ports 220 of housing 202. Thus, the fluid pressure in inlet chamber 32 exerts a pressure force against annular shoulder 250 of piston 240 in the longitudinal direction of retainer ring 258. As discussed above, during the service life of hydrocyclone 100, debris and other particulates entrained in the oily waste stream 122 flowing in direction 142 are deposited in orifice 134, forming a blockage or flow restriction therein, and reducing the rate of flow of oily waste stream 122 through oily waste outlet 116. In response to the fluid restriction provided by the blockage in orifice 134, increased hydrocarbon content flows through treated water outlet 114 and into treated water conduit 40, reducing the effectiveness of hydrocyclone 100 in separating the oil and water phases of the inlet fluid stream 118.

Once a sufficient number of hydrocyclones 100 of fluid separator vessel 20 become blocked due to the presence of debris in their respective orifices 134, personnel operating fluid separation system 10 may commence a cleaning operation to reduce the aforementioned blockage and thereby increase the flow rate of oily waste stream 122 in oily waste conduit 44. Specifically, to commence the cleaning operation, personnel operating fluid separation system 10 open cleaning conduit valve 52 while at least partially closing inlet valve 16. Following the opening of cleaning conduit valve 52 and the at least partial closure of inlet valve 16, fluid pressure in oily waste chamber 36 is thereby increased while fluid pressure in inlet chamber 32 is decreased such that fluid disposed in oily waste chamber 36 is at a higher pressure than fluid disposed in inlet chamber 32. The pressure differential between oily waste chamber 36 and inlet chamber 32 results in a reversal in the direction of fluid flow through the bore 124 of hydrocyclones 100 within fluid separator vessel 20, as identified by arrow 144 in FIG. 5.

With oily waste chamber 36 comprising a greater fluid pressure than inlet chamber 32, a net pressure force is applied against the second end 240b of piston 240, overcoming the frictional engagement between annular seals 210 and 248 and their respective sealing surfaces to shift or displace piston 240 from the operating position 260 shown in FIG. 4 to the cleaning position 262 shown in FIG. 5. Particularly, sealing engagement between annular seal 216 of housing 202 and the inner surface 126 of hydrocyclone 100 and the annular seal 248 of piston 240 and the inner surface 206 of housing 202 direct the fluid flow in direction 144 through the bore 204 of housing 202. Given that fluid disposed in annular chamber 222 is disposed at a lower pressure than fluid disposed in bore 204 of housing 202 due to the pressure differential between chambers 32 and 36, a net pressure force against second end 240*b* of piston 240 as the fluid flows through the bore 242 of piston 240. The pressure force displaces piston 240 until first end 240*a* is disposed directly adjacent to, or physically engages, the second surface 132 of barrier 128, restricting further longitudinal travel of piston 240. As piston 240 shifts into the cleaning position 262, pin 254 is displaced from a position clear of orifice 134 into and through orifice 134, thereby forcibly removing debris disposed therein.

In particular, the pointed tip of pin 254 may pierce or otherwise forcibly eject debris disposed within orifice 134 as piston 240 is displaced into the cleaning position 262. Given that the surface area of the second end 240*b* of piston 240 is greater than the diameter of orifice 134, the amount of force applied against orifice 134 is increased. Specifically, the greater surface area of second end 240*b* multiplies the force exerted by the fluid pressure acting against second end 240*b* relative the force applied against debris disposed in orifice 134 by the fluid pressure disposed therein. In certain embodiments, the fluid flow in direction 144 ceases due to sealing engagement between the outer surface 254 and an inner surface of orifice 134, while in other embodiments, the fluid flow in direction 144 is only reduced. In certain embodiments, fluid disposed in the portion of bore 204 of housing 202 disposed between the first end 240*a* of piston 240 and the second surface 132 of barrier 128 flows through longitudinal ports 256 of piston 240 and into bore 242 of piston 240 to prevent hydraulic lock from restricting the displacement of piston 240 into cleaning position 262. Similarly, fluid disposed in annular chamber 222 flows into inlet chamber 32 via radial ports 220 of housing 202 and radial ports 138 of hydrocyclone 100 as piston 240 is displaced into cleaning position 262. In this manner, the possibility of hydraulic lock inhibiting the operation of orifice servicing system 200 may be mitigated or eliminated without requiring additional check valves or other mechanisms that are known in the art to be susceptible to clogging or blockage.

Once the pin 254 of each orifice servicing assembly 200 has been displaced through its respective orifice 134, the piston 240 of each orifice servicing assembly 200 may be shifted or displaced back into the operating position 260 from the cleaning position 262 in order to return the fluid separator vessel 20 to normal operation. Specifically, in certain embodiments, personnel operating fluid separation system 10 closes cleaning conduit valve 52 while reopening inlet valve 16. The closure of cleaning conduit valve 52 and the reopening of inlet valve 16 reduces fluid pressure in oily waste chamber 36 and increases fluid pressure within inlet chamber 32, resulting in oily waste chamber 36 comprising a lesser fluid pressure than inlet chamber 32.

With the pressure within oily waste chamber 36 and bore 242 of piston 240 reduced in response to the closure of cleaning conduit valve 52 and the reopening of inlet valve 16, fluid pressure acting against annular shoulder 250 of piston 240 displaces or actuates piston 240 from the cleaning position 262 towards the operating position 260 until second end 240*b* is disposed directly adjacent to, or physically engages, retainer ring 258 as the fluid flows in direction 142. In this manner, radial ports 138 of hydrocyclone 100 and the radial ports 220 of housing 202, which provide for fluid communication and substantial pressure equalization between inlet chamber 32 and annular chamber 222, allow piston 240 to be reset into the operating position 260 without requiring the use of a separate return spring, a component that would be susceptible to clogging or blockage.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A fluid separation apparatus, comprising:
   a hydrocyclone having an orifice therein;
   a housing disposed in the hydrocyclone and having a bore;
   a piston disposed in the bore of the housing; and
   a first annular seal disposed between the housing and the piston and configured to restrict fluid communication between the housing and the piston;
   wherein the piston comprises a passage extending through the piston and having a pin coupled to a first end of the piston, the piston being actuatable to move between a first position where the pin is clear of the orifice of the hydrocyclone, and a second position where the pin is disposed in the orifice;
   wherein fluid is permitted to flow into the passage of the piston from the bore of the housing when the piston is disposed in the second position.

2. The fluid separation apparatus of claim 1, wherein the housing comprises a radially extending port.

3. The fluid separation apparatus of claim 1, wherein the piston comprises an annular shoulder extending radially from a second end of the piston.

4. The fluid separation apparatus of claim 1, further comprising a second annular seal disposed between the housing and the piston and configured to restrict fluid communication between the housing and the piston.

5. The fluid separation apparatus of claim 4, wherein the housing comprises a radially extending port disposed axially between the first and second annular seals.

6. The fluid separation apparatus of claim 4, wherein an annular chamber extends from the first annular seal to the second annular seal.

7. The fluid separation apparatus of claim 1, further comprising an endcap coupled to the first end of the piston, the endcap comprising a port extending through the endcap and in fluid communication with the bore of the piston.

8. A fluid separation apparatus, comprising:
   a housing having a bore and a radially extending port in fluid communication with the bore;
   a piston disposed in the bore of the housing, the piston comprising a first end and a second end, a central passage extending centrally through the piston, and a pin coupled to and extending away from the first end; and a first annular seal disposed between the housing and the piston and configured to restrict fluid communication between the housing and the piston;

wherein the piston is configured to move between a first position where the pin is in a retracted position, and a second position where the pin is in an extended position.

9. The fluid separation apparatus of claim 8, further comprising a retainer ring disposed in the bore of the housing and configured to limit the displacement of the piston within the housing.

10. The fluid separation apparatus of claim 8, further comprising a hydrocyclone having a fluid-conveying orifice, wherein the pin of the piston is aligned with the orifice.

11. The fluid separation apparatus of claim 8, further comprising a hydrocyclone, the hydrocyclone comprising a radially extending port in fluid communication with the radially extending port of the housing.

12. The fluid separation apparatus of claim 8, wherein the piston comprises an annular shoulder extending radially from the second end of the piston.

13. The fluid separation apparatus of claim 12, wherein, in response to a pressure force exerted on the annular shoulder, the piston is configured to shift from the second position to the first position.

14. The fluid separation apparatus of claim 8, wherein the piston is configured to permit fluid to flow into the bore of the piston from the bore of the housing when the piston is moved from the first position to the second position.

15. The fluid separation apparatus of claim 8, wherein fluid is flowed through the radial port of the housing when the piston is moved from the first position to the second position.

16. A fluid separation apparatus, comprising:
a housing having a bore;
a piston disposed in the bore of the housing, the piston having a first end, a second end, and a passage extending through the piston;
a first annular seal disposed between the housing and the piston and configured to restrict fluid communication between the housing and the piston; and
an endcap coupled to the first end of the piston, the endcap comprising a pin extending away from the endcap and a port extending through the endcap and in fluid communication with the bore of the piston;
wherein the piston is configured to move between a first position where the pin is in a retracted position, and a second position where the pin is in an extended position.

17. The fluid separation apparatus of claim 16, wherein, as the piston is moved from the first position to the second position, fluid is permitted to flow into the bore of the piston from the bore of the housing.

18. The fluid separation apparatus of claim 16, wherein the piston comprises an annular shoulder extending radially from the second end of the piston, and wherein, in response to a pressure force exerted on the annular shoulder, the piston is shifted from the second position to the first position.

19. The fluid separation apparatus of claim 18, wherein the housing comprises a radially extending port.

20. The fluid separation apparatus of claim 19, wherein the radially extending port of the housing is disposed axially between the first annular seal and a second annular seal disposed between the housing and the piston, wherein the second annular seal is configured to restrict fluid communication between the housing and the piston.

* * * * *